United States Patent

Peschel

[15] 3,703,692
[45] Nov. 21, 1972

[54] MECHANICALLY ADJUSTABLE HIGH VOLTAGE INDUCTIVE REACTOR FOR SERIES RESONANT TESTING

[72] Inventor: Stanley G. Peschel, Brewster, N.Y.

[73] Assignee: Hipotronics, Inc., Brewster, N.Y.

[22] Filed: Nov. 3, 1971

[21] Appl. No.: 195,485

Related U.S. Application Data

[60] Continuation of Ser. No. 871,205, Nov. 3, 1969, abandoned, which is a division of Ser. No. 730,711, May 11, 1968, Pat. No. 3,515,986.

[52] U.S. Cl............................................336/134
[51] Int. Cl...........................................H01f 21/06
[58] Field of Search......336/134, 131, 130, 133, 132, 336/118, 94

[56] References Cited

UNITED STATES PATENTS

| | | |
|---|---|---|
| 1,934,228 | 11/1933 | Hill.........................336/94 X |
| 2,714,184 | 7/1955 | Peck........................336/94 X |
| 1,008,270 | 11/1911 | Jacobi et al................336/134 |
| 1,414,248 | 4/1922 | Armor.....................336/134 X |
| 2,306,000 | 12/1942 | Stilphen..................336/134 X |
| 2,315,609 | 4/1943 | Fielder....................336/134 X |
| 2,419,968 | 5/1947 | Roberts..................336/131 X |
| 2,451,026 | 10/1948 | Friend....................336/134 X |
| 3,213,398 | 10/1965 | Manton...................336/118 |

FOREIGN PATENTS OR APPLICATIONS

| | | |
|---|---|---|
| 410,217 | 1934 | Great Britain.............336/134 |
| 718,576 | 3/1942 | Germany..................336/134 |
| 297,173 | 5/1954 | Switzerland..............336/134 |

Primary Examiner—Thomas J. Kozma
Attorney—Bryan, Parmelee, Johnson and Bollinger

[57] ABSTRACT

Mechanically adjustable inductive reactor for series-resonant corona and dielectric testing of capacitive loads, such as, long lengths of high voltage electrical transmission cable which enable unusually long lengths of unusually high voltage cable to be tested conveniently and economically. The invention provides advantages when testing shorter lengths of cable at the usual voltage levels of 150,000 volts or 225,000 volts, but the advantages become greater at the higher voltages and longer lengths forseen in the future by the inventor. A mechanically adjustable high-voltage inductor is resonated directly in series with the cable capacitance of a long cable at high voltage. Three embodiments of mechanically adjustable, low flux-fringing, inductors are disclosed which are linear in inductance variation as a function of mechanical movement and are convenient and quiet to operate as well as being economical in amounts of steel and copper materials employed for a given electrical (kilovolt-ampere) rating.

2 Claims, 8 Drawing Figures

INVENTOR.
Stanley G. Peschel

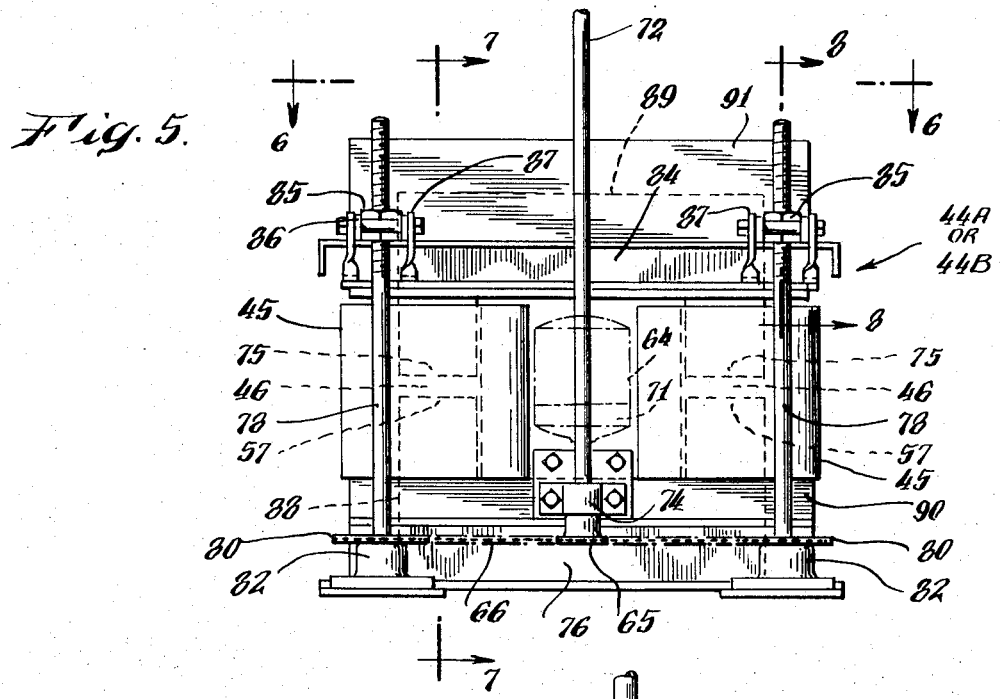
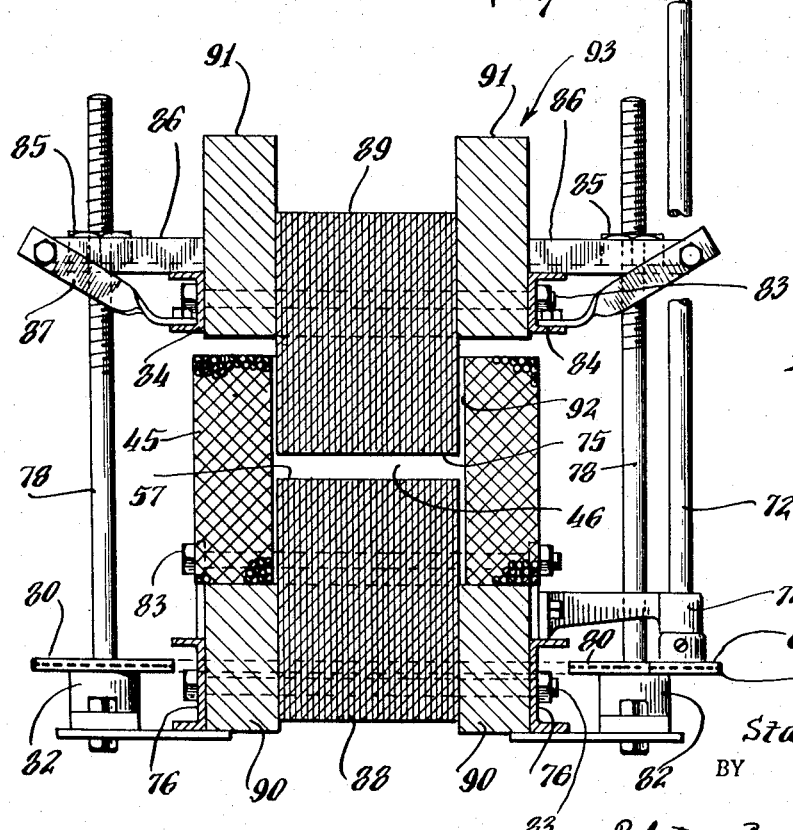

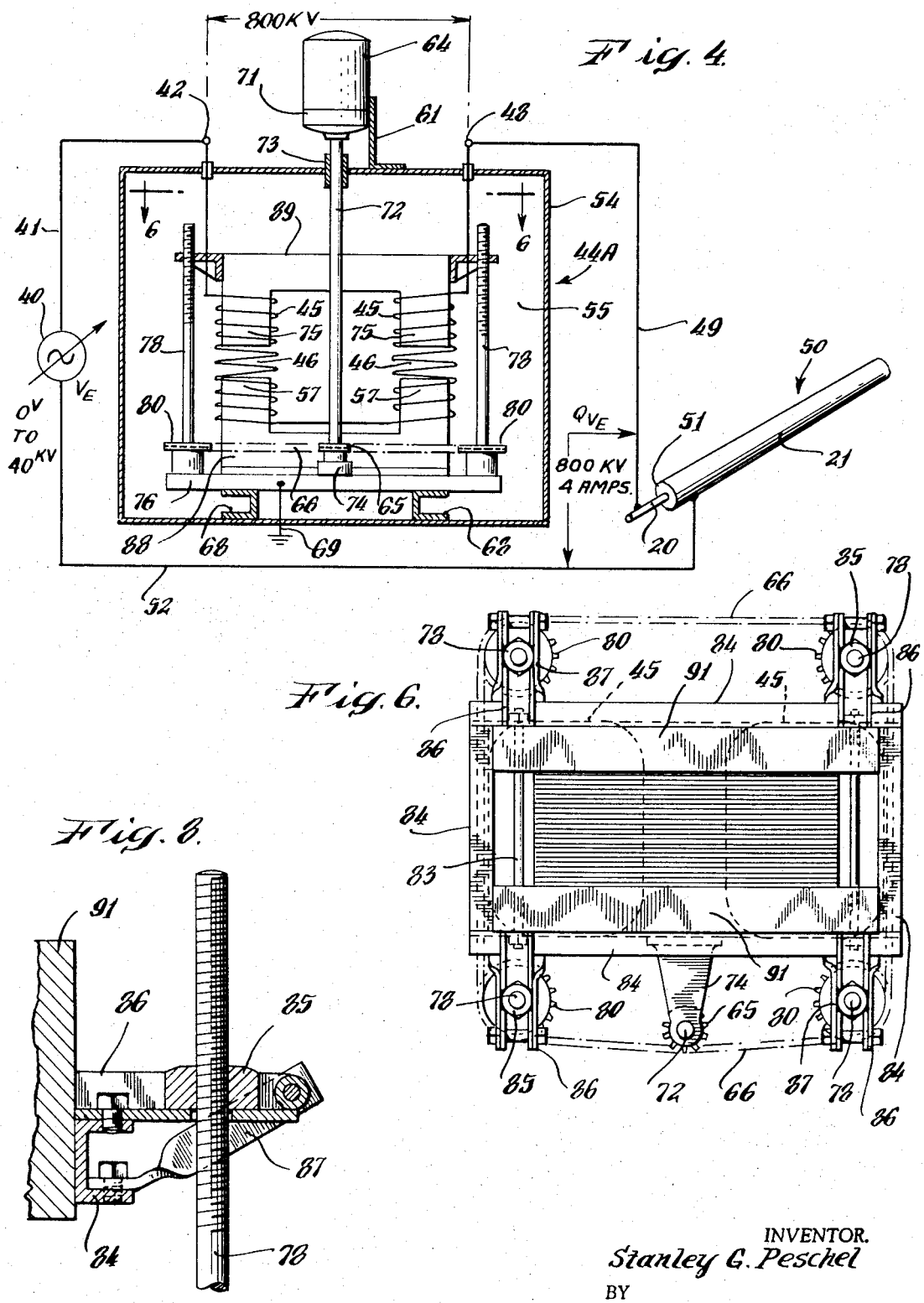

MECHANICALLY ADJUSTABLE HIGH VOLTAGE INDUCTIVE REACTOR FOR SERIES RESONANT TESTING

This is a continuation of application, Ser. No. 871,205 filed Nov. 3, 1969, now abandoned, which is a divisional of application, Ser. No. 730,711 filed May 21, 1968 now U.S. Pat. No. 3,515,986.

The present invention relates to apparatus for series resonant corona and dielectric testing of long lengths of high-voltage electrical transmission cable.

At the present time the vast majority of high-voltage underground electrical transmission cables are characterized by having protective lead sheaths enclosing paper dielectric surrounding the conducting cores of copper or aluminum. The paper dielectric is impregnated with oil under pressure so as to maintain a suitable dielectric insulation. These cables are often produced in lengths of a maximum of 500 feet, and when installed in service, there is a manhole provided at 500-foot intervals, with the lengths of cable being connected in the manhole to the adjacent lengths of cable and also connections are provided for maintaining the oil under pressure within the cables. These 500-foot lengths of cable are tested for corona and dielectric strength by conventional techniques using step-up transformers, before the lengths are placed in use.

Looking ahead to the future, it appears to me that the use of solid dielectric insulated cable will become quite prevalent and that these cables will be produced having lengths of the order of miles and even of tens of miles. Moreover, looking ahead I foresee that as solid dielectric insulation materials become proven by experience in actual service, it will become prevalent to operate solid dielectric electrical transmission cables at extremely high voltages such as in the range from 345 kilovolts up to 750 kilovolts, and at even higher potentials.

In order to test a long length of such high voltage electrical transmission cable it will be necessary to deal with the extremely large capacitive reactance provided by such a long length of cable. The present conventional methods, which involve the use of a single phase step-up transformer to apply high voltage tests to a short length of cable, will become prohibitively expensive for such long lengths of cable in the future, because their capacitive reactance will present a single-phase load of more than a thousand kilovolt-amperes. Such a single-phase reactive load is an out-of-phase load and it is very expensive to supply such a large reactive load by electrical power purchased from a public utility through its power lines.

FIG. 1 is a schematic circuit diagram showing this conventional prior art use of a step-up transformer for testing the insulation of lengths of cable up to 500 feet.

It has been suggested that electrical cables be tested by a combination of a transformer plus an adjustable inductor. This inductor has a coil mounted around a rotatable laminated core associated with a stationary laminated pole piece. The inductance is changed by varying the angle between the rotatable core and the pole piece. The purpose being to place the primary of the transformer in resonance with the capacitive reactance of the cable.

FIG. 2 is a schematic circuit diagram showing this prior art system.

Among the disadvantages associated with the prior art system of FIG. 2 are those resulting from the increased flux fringing which occurs as the flux through the reactor is increased. Consequently, the inductance of the inductor changes with the amount of current flowing through its winding. This characteristic necessitates constant adjustment tuning of the inductor as the test voltage applied to the cable is increased. In a manual tuning system, the inductance change which occurs with change in applied test voltage is bothersome because it requires continual attention and adjustment by the operator. It is possible to combat this problem by utilizing a closed loop servo system to drive, i.e. adjust, the adjustable inductor. This servo system can be arranged to tune the inductor to maintain resonance, but the use of such servo system increases the complexity and expense of the test system.

Another disadvantage associated with the prior art test system of FIG. 2, is the tremendous amount of laminated core material and of electrical conductor material needed to supply the magnetic requirements. For example, assuming that the system of FIG. 2 is to have a test capacity of 600 kilovolt-amperes (KVA), then the transformer primary must have a 600 KVA capacity, the transformer secondary must have a 600 KVA capacity, and the adjustable inductor must have a 600 KVA capacity, i.e., a total of 1,800 KVA of magnetic core and conductor material. This amounts to 9,000 pounds of copper plus 21,000 pounds of iron to provide a test capacity of only 600 KVA.

Among the many advantages provided by the apparatus embodying the present invention are those resulting from the fact that they enable the test capacity to be tripled for given weight of conductor and core materials, as compared with the system of FIG. 2.

Among the further advantages of the electrical cable insulation testing apparatus embodying the present invention are those resulting from the fact that the series resonant circuit eliminates the high-voltage excitation current requirements of the prior art systems wherein transformers are used. Moreover, this series resonant circuit provides cancellation of harmonic distortion as well as eliminating much of the noise such as is associated with the rotatable core reactor of the system of FIG. 2.

Additional advantages of the mechanically variable inductors embodying this invention result from the fact that they provide substantially linear variations in inductance relative to changes in the gap spacing and are convenient and quiet in use as well as being economical in employment of copper and iron materials relative to their electrical rating.

The apparatus of the present invention generate the desired high-voltage alternating current for corona and dielectric testing of long-length transmission cables in a manner which is practicable and economic. A test system embodying the invention utilizes the capacitive reactance of the cable to resonate against the inductance of an oil-immersed adjustable inductor. The series resonant action of the inductor and cable capacitance produce a voltage multiplication applied across the dielectric of the cable to test it for corona and dielectric strength.

Among the further advantages of the apparatus of the present invention, are those resulting from the fact that the adjustment of the inductance is substantially linear. The ampere-turns produced by the current flowing through the winding which is positioned directly around the adjustable gap produce a magnetomotive force which tends to constrict the flux to the iron pole pieces and to the region of the gap between these pole pieces, thus fringing effects are minimized, and therefore the inductive reactance is substantially linearly adjusted as a function of the in or out movement of a movable core piece. This linearity avoids the necessity to tune continuously as the test voltage is increased and avoids any need for a servo system.

In this specification and in the accompanying drawings, are described and shown a mechanically adjustable inductive reactor for high voltage corona and dielectric testing of long lengths of electrical transmission cables embodying the present invention, and it is to be understood that this disclosure is not intended to be exhaustive nor limiting of the invention, but on the contrary is given for purposes of illustration in order that others skilled in the art may fully understand the invention and the manner of applying the apparatus in practical use and will understand how to modify and adapt the several illustrative embodiments of the invention as may be best suited to those conditions which are present in a particular electrical cable test installation.

The various objects, aspects, and advantages of this invention will be more fully understood from a consideration of the following specification in conjunction with the accompanying drawings, in which:

FIG. 4 is a schematic circuit diagram of a test system embodying the invention, similar to FIG. 3 except that the mechanically variable inductor includes a pair of adjustable gaps in the magnetic core;

FIG. 5 is an elevational view of the reactor of FIG. 4 with the tank removed and shown on enlarged scale;

FIG. 6 is a top plan view of the mechanically adjustable reactor of FIGS. 4 or 5 as seen along the line 6—6 in FIG. 4 or 5.

FIG. 7 is a cross sectional view as seen along the line 7—7 in FIGS. 4 or 5, shown on enlarged scale; and FIG. 8 is an enlarged partial sectional view taken along the line 8—8 in FIG. 5.

Figure 1:
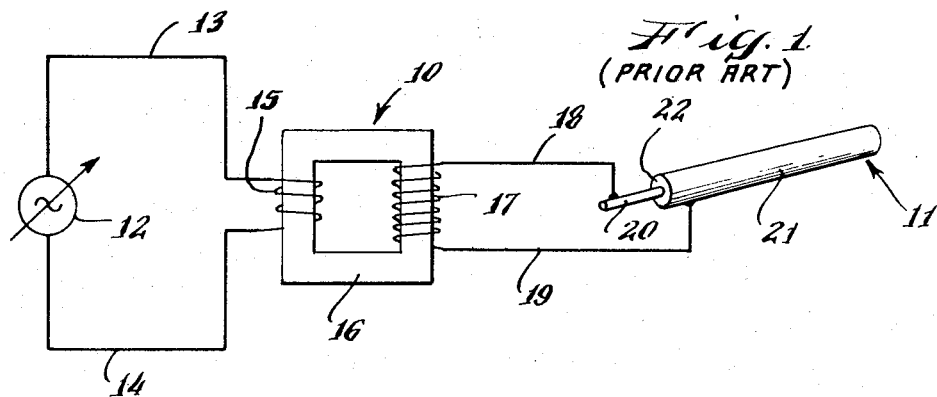
FIG. 1 is a schematic circuit diagram of a prior art test system utilizing a step-up transformer for testing short lengths of transmission cable.

Referring to the drawings in greater detail, FIG. 1 shows a prior art system utilizing a step-up transformer 10 for testing a short length of electrical transmission cable 11. A suitable source of single-phase alternating current 12, which is adjustable in voltage, for example such as from zero to 220 volts as provided by an autotransformer connected to one phase of an electrical utility power line, is connected by a pair of leads 13 and 14 to the primary winding 15 of the step-up transformer 10. This transformer includes a core 16 having a high-voltage secondary winding 17 wound thereon and connected by leads 18 and 19 to the cable 11 to be tested. This cable 11 includes a conductor 20 to which is connected the lead 18 and a conducting sheath 21 to which is connected the lead 19 for the purpose of testing the insulation material 22 by applying the high voltage from the secondary 17 thereto.

The present conventional prior art test arrangement as shown in FIG. 1 is suitable for testing short lengths of cable, such as 500 feet, because the reactive load being applied to a single phase 12 of the power line is not unduly large. However, the arrangement of FIG. 1 would be prohibitively expensive for testing a cable miles long, and it would be quite uneconomic for testing a high voltage cable, i.e., above 345 kilovolts, which is tens or even scores of miles long. The resulting large single-phase reactive load would be uneconomically expensive as well as being disruptive to the stable electrical conditions which a public utility is required to maintain.

Figure 2:
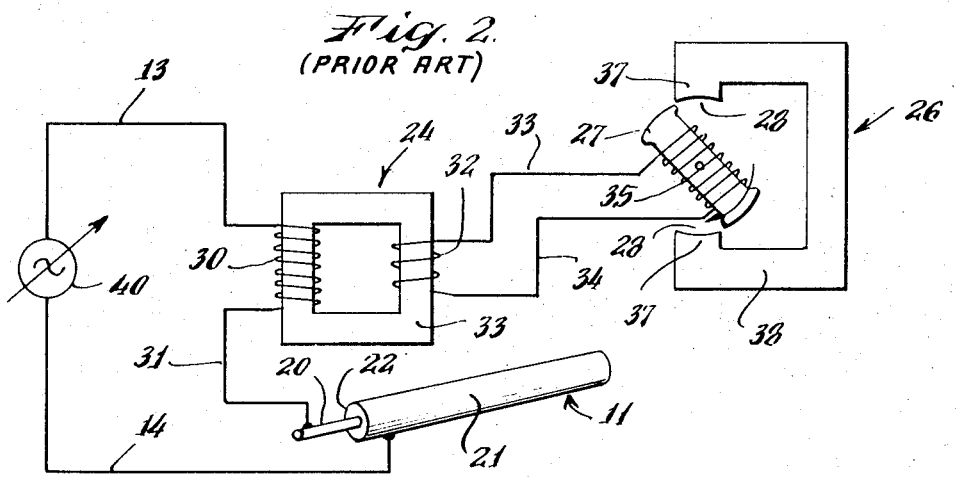
FIG. 2 is a schematic circuit diagram of a prior art test system utilizing a step-down transformer in conjunction with an inductance reactor connected to the secondary of the transformer and having a rotatable core.

FIG. 2 shows a prior art system in which a step-down transformer 24 is used together with an adjustable inductor 26 having a rotatable laminated core member 27 defining a pair of adjustable air gaps 28. A suitable source of alternating current excitation voltage 40 is connected by a lead 13 to one side of the high-voltage primary winding 30 of the step-down transformer 24. The other side of this winding 30 is connected by a lead 31 to the conductor 20 of the cable 11 to be tested, with the cable sheath 21 being connected by a return lead 14 to the alternating current source 40. The source 40 is adjustable in voltage, for example, from zero up to 40 KV and is provided by an autotransformer connected to one phase of an electrical utility power line, with the voltage from the autotransformer being increased by a step-up transformer whose secondary is connected to the leads 13 and 14 in FIG. 2.

In order to adjust the effective inductance of the primary winding 30 so as to resonate its inductance with the capacitance of the cable 11, there is a low-voltage secondary winding 32 on the core 33 of the transformer 24. This winding 32 is connected by leads 33 and 34 to an inductor winding 35 which surrounds the rotatable core member 27. The inductance of the inductor 26 is changed by varying the angle of the rotatable core member 27 with respect to the pole pieces 37 of a stationary core 38.

When the core member 27 is turned to a large angle with respect to the pole pieces 37, the size of the air gaps 28 is increased, thus increasing the reluctance of the magnetic circuit of the inductor 26 and hence reducing its inductance. When the core member 27 is turned to a small angle with respect to the pole pieces 37, the inductance of the inductor 26 is increased.

The transformer action of the transformer 24 causes the adjusted inductance value of the inductor 20 to be reflected into the primary winding 30 as a greatly increased inductance value. The increase in inductance is the square of the primary to secondary turns ratio (N) of the transformer 24, i.e., the apparent inductance of the primary winding 30 is $N^2 L$, where N is the turns ratio and L is the inductance of the inductor L.

The advantage of the prior art system of FIG. 2 is that the inductor 26 is operated at a relatively low voltage.

Among the disadvantages associated with the system of FIG. 2 are those resulting from the increased fringing of magnetic flux about the pole pieces 37 and about the ends of the member 27 which occurs as the current through the winding 35 is increased.

The effective variation of the size of the air gaps 28 in operation becomes a complex function of the angle of rotation and of the level of magnetic saturation of the core member 27 and of the arcuate pole pieces 37. Consequently, the effective inductance is non-linear and changes with the amount of current flowing through its winding 35. This variation in effective inductance necessitates constant adjustment of the reactor 26 as the test voltage applied to the cable 11 is increased as a result of changing the level of the excitation voltage being supplied by the source 40, and thus the system requires constant attention and adjustment by the operator. While it is possible to use a servo system to produce the constant adjustment of the core member 27, as the excitation voltage of source 40 is changed, such a servo system raises the complexity and cost of the test installation.

Another disadvantage of the prior art system of FIG. 2 is the tremendous amount of laminated core material and of electrical conductor material needed to construct the transformer 24 and inductor 26 so as to have the necessary electrical and magnetic capacity. For example, assuming that the system of FIG. 2 is to have a test capacity of 600 KVA, then the primary winding 30 must have a 600 KVA capacity and its secondary 32 must also have a 600 KVA capacity. Similarly, the inductor 26 must have a 600 KVA capacity. This amounts to a total of 1,800 KVA of capacity associated with three windings 30, 32 and 35 to provide a test capacity of only one-third of this value. It will be appreciated that this system of FIG. 2 is very wasteful of material, but so far as I am aware it represents the most advanced state of the prior art available today.

Figure 3:
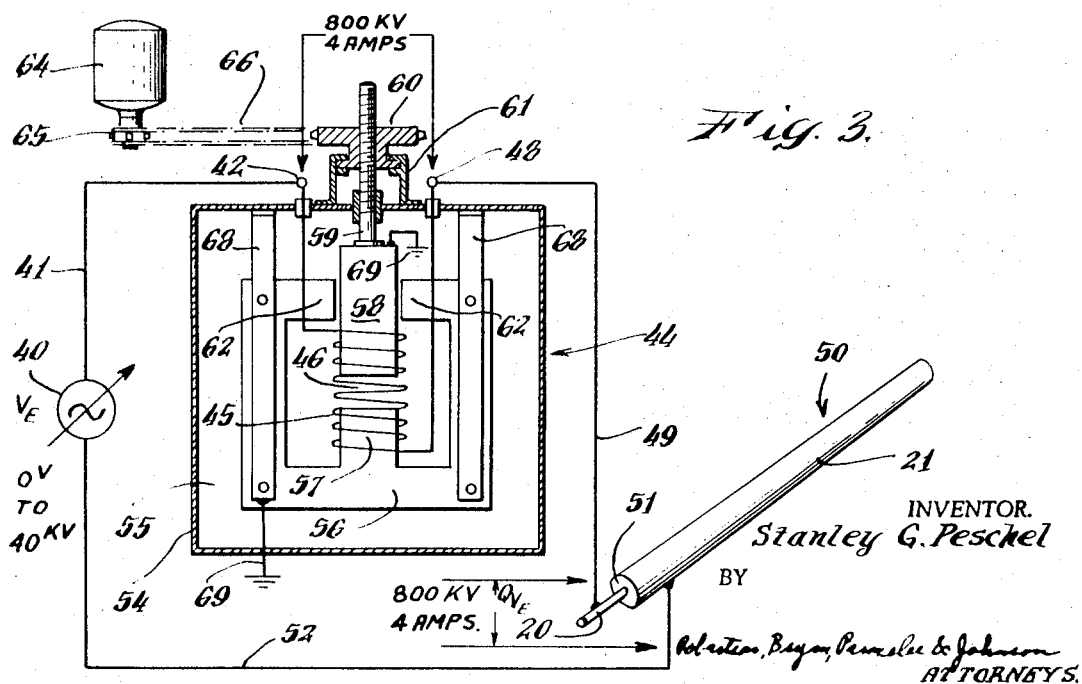
FIG. 3 is a schematic circuit diagram of test system utilizing the series resonant apparatus of the present invention for corona and dielectric testing of long lengths of electrical transmission cable, i.e., up to scores of miles in length.

In the apparatus embodying the present invention as shown in FIG. 3, an adjustable source of alternating current excitation voltage 40 is used, for example similar to the source 40 of FIG. 2. That is, the adjustable excitation source 40 is capable of providing a suitable range of voltage, for example a voltage from 0 up to 40 kilovolts, and this source 40 may comprise an autotransformer connected to a public utility power line with the voltage supplied by the autotransformer being increased by a step-up transformer whose secondary winding comprises the output of the source 40. One side of the source 40 is connected by a lead 41 to one terminal 42 of an oil-immersed, high voltage inductive reactor 44 having its coil 45 surrounding the adjustable gap 46. The other terminal 48 is connected by a lead 49 to the conductor 20 of a long length of cable 50 having a solid dielectric 51 surrounded by a sheath 21. This sheath 21 is connected by a lead 52 to the other side of the adjustable excitation source 40.

The inductive reactor 44 has a welded steel tank 54 filled with oil 55 and contains a stationary laminated core 56 which has an E-shape. The center leg of the E-shaped core is the fixed pole 57 which is adjacent to the adjustable gap 46. In opposed relationship to the pole 57 is an adjustable core section 58 which is connected to a shaft 59 extending vertically up through an oil seal bushing at the top of the tank 54. A feedscrew gear wheel 60 engages a screw thread on the shaft 59, and this gear wheel 60 is mounted and retained by a frame bracket 61 above the tank 54 so that turning this wheel 60 moves the core section 58 up and down, thus adjusting the spacing of the gap 46.

In order to turn the gear wheel 60, a small controllable, reversible, direct-current electric motor 64 is provided with a sprocket 65 on its shaft revolving a chain 66 which engages and drives the wheel 60. As will be understood, there is a suitable control circuit (not shown) for controlling the motor 64, but this circuit is not shown because such circuits for controlling direct current motors are conventional and well known.

All of the core structure 56 and movable core section 58 and shaft 59 are at ground potential, the core 56 being secured to the tank 54 by suitable brackets 68, and being grounded by connection 69. The coil 45 is at a very high alternating voltage potential, as will be explained, this coil 45 being immersed in the oil 55. The winding 45 directly surrounds the gap 46. By virtue of this arrangement the ampere turns (magnetomotive force) of the coil 45 sets up a magnetizing force around the gap 46 which constricts the magnetic flux so as to cause the flux to pass through the pole 57 and directly across the gap 46 into the opposite pole which is provided by the adjacent end of the movable core section 58. Thus, flux fringing is substantially eliminated.

The inductance L of a reactor is inversely proportional to the length "lg" of the gap 46 as measured from the pole 57 to the movable core section 58:

(1)  $L = (3.2 N^2 Ac/lg) \times 10^{-8}$ Henries

Where "$N^2$" is the square of the number of turns in the coil 45, "Ac" is the cross sectional area of the laminated steel core, and "lg" is the length of the gap 46 as defined above.

By virtue of the substantial elimination of flux fringing, the inductor 44 provides an inductance which linearly varies with respect to movement of the core section 58. Moving this core section 58 upwardly to increase the gap length linearly reduces the inductance, and vice versa.

Other advantages of the apparatus of this invention are those resulting from the fact that a very large voltage multiplication effect is provided by the high "Q" achieved with the single coil 45, as compared with the action of the three windings 30, 32 and 35. As used herein "Q" is defined as the ratio of the magnetic energy stored per cycle to the energy dissipated per cycle, and it is directly proportional to the ratio of the effective inductance L divided by the effective resistance R, which takes into account hysteresis and eddy current losses, as well as resistance losses in the conductors of the coils. The single coil 45 has proportionately fewer losses associated with it than the three windings 30, 32 and 35. Consequently, the "Q" of the reactor 44 is higher than the "Q" associated with the system of FIG. 2.

In operation the inductance L of the inductor 44 is adjusted to be resonant with the capacitance C existing across the dielectric 51 between the conductor 20 and sheath 21 to create greatly increased alternating current voltages across the capacitive reactance of the dielectric 51 to to test it. In this series resonant circuit the voltage $V_L$ appearing across the terminals 42–48 of the inductor is the product of the excitation voltage $V_E$ and Q, and similarly the increased voltage applied across the dielectric 51 of the cable 50 is the product of the excitation voltage and Q:

(2) $V_L = Q V_E$ (3) $V_C = Q V_E$

For example, as shown a relatively high Q of at least 20 is provided by the reactor 44, and thus with an excitation voltage $V_E$ of 40 kilovolts, the resulting voltage $V_C$ appearing across the cable dielectric 51 to be tested is twenty times as large, namely 800 kilovolts. This same magnitude of voltage, 800 KV, appears across the reactor terminals 42 and 48.

Also, there exists a large current flow which surges in this series-resonant circuit, for example, as indicated this may amount to 4 amperes. In effect this series-resonant action in a high "Q" circuit is providing 3,200 kilovolt-amperes of reactive power available for testing the cable 50 up to a voltage of 800 kilovolts, while utilizing an excitation source of only 40 kilovolts at 4 amperes, namely 160 KVA.

In a testing operation the inductor 44 is adjusted to an inductance value L which is resonant at 60 cycles per second (60 $H_Z$) with the capacitance of the cable 50. This resonance adjustment is made while the excitation source 40 is set at a low voltage level. With the test circuit now in series resonance, the excitation voltage $V_E$ of the source 40 is progressively increased up to the desired level, for example 40 KV. Correspondingly, the voltage $V_C$ appearing across the cable dielectric 51 progressively increases up to a value of $QV_E$, which in this case is 800KV. If there is no breakdown in the insulation 51, then the test has shown that the long cable 50 is in satisfactory condition to be installed in service as an electrical transmission cable.

In addition to the substantial linearity and other advantages of the inductor 44, it is noted that the adjustable core member 58 moves between the two symmetrical side legs 63 of the E-shaped stationary core 56. Thus, the magnetic attraction forces exerted by the two legs 63 on the core member 58 are equal and opposite so that they balance each other. Hence, the side forces on the member 58 are balanced and cancel out.

The only remaining force on the member 58 is the magnetic attraction force between the stationary pole 57 and the end of the core section 58. This attraction force extends across the adjustable gap 46 and is in direct axial alignment with the adjusting shaft 59. Thus, the shaft 59 can be adjusted without any side loading or bending or major frictional loading, because the force imposed thereon is a tension force directed along the axis of shaft 59. As a a result a smooth adjusting action is provided even though the magnetic attraction forces are very large.

In the method and system of FIG. 4 all of the components are the same as in FIG. 3, and are indicated by corresponding reference numbers, except that the inductor 44A has a different core and winding structure providing a pair of gaps 46, as will be explained in detail further below. Also, the controllable adjustment drive motor 64 is connected through a suitable speed-reducing gear unit 71 to a long sprocket shaft 72 passing down through an oil seal bushing 73 at the top of the tank 54. The lower end of this shaft 72 is journaled in a bearing 74 secured to the inductor frame 76, and it carries a sprocket 65 driving a chain 66 for adjusting the pair of gaps 46 in the core structure. Four feedscrews 78 are driven by sprockets 80 engaged by the chain 66 for adjusting both gaps 46 simultaneously and equally.

The method and system of FIG. 4 operate similarly to those described further above in connection with FIG. 3 and provide similar advantages. For very high voltage operation the pair of windings 45 are connected in series and a tank 54 is used to provide an oil immersed inductor 44A, as shown in FIG. 4. When it is desired to operate at lower voltages, the tank 54 is omitted, to provide an air-exposed inductor as shown in FIG. 5, the coils 45 being wound with fewer turns of heavier wire. They may be connected in series or parallel for lower voltage operation.

The long sprocket shaft 72 is used for the oil-immersed inductor 44A. In the case of the air-exposed inductor 44B, the shaft 72 is shortened so that the control motor and gear reducing unit can be mounted down near the frame channels 76, as indicated by the dashed outline 64, 71, in FIG. 5.

The laminated core for the inductors 44A or 44B comprises a lower fixed U-shaped section and an upper movable U-shaped section, with the gaps 46 being located between the fixed and movable poles 57 and 75 (FIG. 7) formed by the legs of the respective core sections. The location of the windings 45 surrounding the respective gaps 46 confines the flux to the gaps and adjacent poles 57 and 75 so as to prevent fringing, thus providing substantially linear changes in inductance L as a function of the gap spacing lg.

The laminations of the core sections 88 and 89 are securely clamped between pairs of non-magnetic frame members 90, 90 and 91, 91 provided by strong wood blocks which are fastened by lower and upper pairs of reinforcing steel channel frames 76, 76 and 84, 84, suitably held by through bolts 83. There is a small clearance space 92 (FIG. 7) within the windings 45 surrounding the movable poles 75.

The movable core assembly 93 comprising the upper core section 89, together with its clamp members 91, 91, and its frame 84, 84 is supported by brackets 86 and diagonal braces 87 (FIG. 8) secured to the flanges of the channel frames 84. The brackets 86 are each welded to a feednut 85 engaging the respective feedscrews 78.

Each of these feedscrews 78 has the same pitch and they are driven in synchronism by their common drive means, comprising the chain 66 engaging the four sprockets 80 of the same size. The lower ends of these feedscrews are mounted in thrust bearings 82 secured to the lower channel frames 76.

The powerful force of the magnetic attraction between the pairs of poles 57 and 75 is equally borne by the four feedscrews 78. By virtue of the fact that these feedscrews are mounted at only one end, the whole upper assembly 93 is free to move laterally so that the respective pairs of poles 57 and 75 can pull themselves into alignment. Thus, all side thrust is eliminated and the adjustment is smooth in operation.

It will be understood that the long length of cable 50 being tested may have various forms. The cable 50 may include one inner conductor 20 with a conductor sheath 21 and dielectric extending therebetween, as shown, or may include a plurality of the conductors 20 with dielectric extending therebetween such as for use in polyphase electrical transmission lines. In the case of multiple conductors 20 the connections 49 and 52 are made to each of the conductors in turn taken in pairs for testing the insulation between each and every conductor 20 as well as between each conductor 20 and the sheath 21 in cases where there is such a conductor sheath.

From the foregoing it will be understood that the illustrative embodiments of the series resonant corona and dielectric testing apparatus of the present invention are well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and not in a limiting sense and that in certain instances, some of the features of the invention may be used without a corresponding use of other features, all without departing from the scope of the invention as defined by the following claims.

What is claimed is:

1. A mechanically adjustable inductive reactor for testing capacitive loads, such as electrical cables comprising fixed frame means, a fixed U-shaped core section having a pair of legs and being secured to said fixed frame means, movable frame means, a movable U-shaped core section having a pair of legs and being secured to said movable frame means, said fixed and movable frame means holding the respective core sections with their respective pairs of legs extending toward each other to define two pairs of poles in opposed relationship with adjustable gaps between the respective pairs of opposed poles, a pair of windings, each winding surrounding a pair of opposed poles and the adjustable gap therebetween, a plurality of parallel feedscrews extending parallel with the legs of said core sections and extending between said fixed and movable frame means said feedscrews being outside of said pair of windings, common reversible drive means for simultaneously driving all of said feedscrews for simultaneously and equally adjusting the length of each of said gaps to adjust the inductance of said reactor, thrust bearings rotatably securing said feedscrews at one end only to said stationary frame means, the other ends of said feedscrews connecting with said movable frame means in threaded engagement therewith for moving the legs of said movable core section toward and away form the legs of said fixed core section, said other ends of said feedscrews and said movable frame means being free to move laterally with respect to said fixed frame means allowing said movable frame means together with said movable core section to move laterally in response to the magnetic attraction between the pairs of opposed poles to bring the pairs of opposed poles into direct alignment one with another within the respective windings.

2. A mechanically adjustable inductive reactor for resonant testing of high voltage dielectric comprising two magnetically permeable core sections each having a U-shaped, fixed frame means secured to one of said core sections for holding it stationary, movable frame means secured to the other core section, said fixed and movable frame means holding said fixed and movable core sections with the respective legs of the two U-shaped core sections extending toward each other providing two pairs of opposed poles defining a gap between each pair of opposed poles, said movable frame means being movable toward and away from the fixed frame means for adjusting the length of each of said gaps, a pair of windings, each winding surrounding a pair of opposed poles and also surrounding the adjustable gap therebetween, four parallel feedscrews each extending between said fixed and movable frames and being positioned outside of said pair of windings, said feedscrews each being mounted at one end only to said fixed frame means and the other ends of said feedscrews being free of said fixed frame means to permit lateral movement thereof, said other ends of said feedscrews being mounted to said movable frame means and said movable frame means being free for lateral movement relative to said fixed frame means, said movable frame means and movable core section forming an assembly which can move laterally such that the pairs of opposed poles can pull themselves into alignment while the force of magnetic attraction is equally borne by the four feedscrews, and reversible drive means associated with all of said feedscrews for simultaneously and equally adjusting the length of each of said gaps to adjust the inductance of said reactor.

* * * * *